United States Patent Office 3,819,771
Patented June 25, 1974

---

3,819,771
POLYMERIC PHOSPHITE POLYOLS
Wadim Batorewicz, 1523 Chapel St.,
New Haven, Conn. 05511
No Drawing. Continuation-in-part of abandoned application Ser. No. 169,054, Aug. 4, 1971. This application May 8, 1972, Ser. No. 251,724
Int. Cl. C07f 9/08
U.S. Cl. 260—921                                          13 Claims

ABSTRACT OF THE DISCLOSURE

Certain hydroxylic pentaerythritol phosphites containing 15–20% of phosphorus are polymerized by heating them until the viscosity at 25° C. has reached at least 20,000 centipoises. The resulting amorphous compositions comprising polymeric organo-phosphite polyols are suitable for interaction with polyisocyanates in the production of polyurethanes in which the phosphites become a substantive part of the polymers. Polyurethane foams so made have superior flame-retardant properties compared with those of other phosphorus-containing polyurethanes. The polymeric phosphite polyols are also useful as flame-retardants in polyester and polyvinyl chloride compositions.

---

This application is a continuation-in-part of application Ser. No. 169,054, filed Aug. 4, 1971, now abandoned.

BACKGROUND OF THE INVENTION

The crystalline, bicyclic or bridged-ring pentaerythritol phosphite of melting point about 62–64° C., having the structure

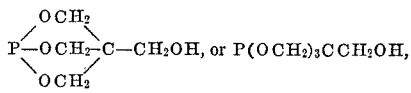

and sometimes called the "hydroxymethyl bicyclic phosphite" of pentaerythritol, is described in British Pat. 889,338 (Hooker Chemical Corp.) and in U.S. Pats. 3,000,840 (Ainsworth) and 3,155,703 (Emmons et al.). In each case, the crystalline phosphite is made in high yield by transesterification from pentaerythritol and a tri-hydrocarbon phosphite, with an alkali metal or an alkali metal derivative, or an amine, as catalyst, or without a catalyst. The hydroxymethyl bicyclic phosphite is distillable unchanged. Its P content is 18.9%.

Monomeric products of partial transesterification result when the mole ratio of pentaerythritol to trihydrocarbon phosphite is less than 1.0 or is 1.5 or higher. U.S. Pats. 2,847,443 (Heckenbleiker et al.) and 3,310,609 (Baranaukas et al.).

The utility of many compounds of phosphorus as flame retardants in organic resins is well known. Some are merely additives, have no substituents that are reactive with the resin or the resin components. Therefore, they do not become integrated into the polymer chain structure, and may be subject to loss by leaching, evaporation, or sublimation. Others have one or more hydroxyl groups and therefore are reactive with isocyanates and become a substantive part of the polymer when present in a composition of polyisocyanates and other polyols.

A bicyclic pentaerythritol diphosphite has been used in the production of polyurethanes—U.S. Pat. 3,378,497 (Lanham) and British Pat. 889,338.

THE INVENTION

I have discovered that certain hydroxylic phosphites of pentaerythritol can be converted into viscous polymers by heat. The polymeric compositions thus obtained are useful flame retardants for various organic resins, and are of especial value in the production of polyurethanes having superior flame retardancy and good physical properties.

The pentaerythritol phosphite which I prefer to use is the one composed of equimolar amounts of pentaerythrityl and phosphito moieties and having a melting point, reported in the literature, of about 62°–64° C., and a boiling point of 112° C. at a pressure of 0.3 mm. of Hg, and having the bicyclic structure $P(OCH_2)_3CCH_2OH$. It may be prepared by methods known to the art, with or without the use of a catalyst. Other, closely related, pentaerythritol phosphites useful in my invention have a slight preponderance of pentaerythrityl over phosphito, so that the P content may be as low as about 15% (instead of the value 18.9% P for the 1:1 ester).

I usually polymerize the pentaerythritol ester without isolating it from the reaction mixture.

The tertiary phosphite esters contemplated for use in preparing the bicyclic phosphite esters and polymers thereof may be any trihydrocarbon phosphites which evolve carbinols or phenols that are readily removable from the reaction mixture by distillation. They include the trialkyl phosphites—e.g., the trimethyl, triethyl, tripropyl, tributyl, triisobutyl, tricyclohexyl, tris(2-chloroethyl), tris(2-chloropropyl) phosphites and the like—and triaryl phosphites—e.g., triphenyl, tritolyl (tricresyl), and tri(nonylphenyl) phosphites, and the like. Preferably I use trimethyl phosphite.

The pentaerythritol used may be of any convenient purified grades, commonly containing 95–98% of monomeric pentaerythritol, or it may be of a technical grade containing less than 20%, preferably not more than 15%, of pentaerythritol dimer and higher polymers.

In order to produce the particular phosphite compositions of my invention, it is necessary that the reaction components be used in certain proportions: at least 1.0 mole but less than 1.5 moles of pentaerythritol is used for each mole of trihydrocarbon phosphite, in order to assure the production of a usable, fluid material. Proportions outside of these limits are known to lead to the formation of a variety of other, more complex phosphite esters which are solids and are not miscible with the polyols commonly used for making polyurethanes, and so are not usable therein.

The temperatures at which the transesterification may be carried out range from 100° to 150° C. The time required for the transesterification is generally from one-half to two hours. The carbinol or phenol released in the course of the reaction may be removed continuously during the progress of the reaction, as described in the prior art; or, it may be more convenient to remove the carbinol or phenol under reduced pressure after completion of the transesterification.

After removal of the alcohol or phenol, the product obtained is maintained at an elevated temperature, between 100° and 150° C., for whatever length of time is found necessary to raise its Brookfield viscosity at 25° C. to the desired value in the range from about 20,000 to about 800,000 centipoises. Usually, it is desirable to obtain a product having a viscosity of at least 50,000, and more preferably of from 100,000 to 300,000 centipoises. This may require from zero time to several hours. When technical grades of pentaerythritol comprising 85–88% of monomer are used, the polymerization proceeds rapidly, and is often complete, as judged by attainment of the desired viscosity, by the time the alcohol or phenol has been removed. In such case, the reaction is not always stopped at the precise viscosity desired, but batches having different viscosities may readily be blended in order to adjust the average viscosity of the blend to the desired value. When the pentaerythritol used comprises 95–98% of monomer, polymerization is slower, requiring several hours of further heating between 100° and 150° C. In this case, the polymerization can easily be stopped at the desired viscosity value. The viscosity of any of the polymerized compositions may be adjusted by addition of dimethylformamide.

The process readily lends itself to batch-wise, semi-continuous, or continuous operation. It is important to note that temperatures above 150° C., particularly those above 180° C., should be avoided, since, at higher temperatures, an exothermic, autocatlytic reaction may occur, leading to a rapid increase in temperature and pressure and possible damage to the reactor and surroundings.

The polymerized phosphite polyol materials prepared according to my invention are clear, resinous fluids of high viscosity. Their analysis, character and behavior are consistent with their being a mixture of unchanged hydroxymethyl bicyclic pentaerythritol phosphite monomer and a series of polymers thereof having nominally the following structure:

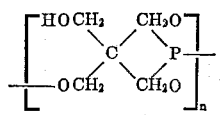

wherein $n$ in each compsition has a plurality of values from two to ten. Although the precise structure of the polymers is not known, the elemental analysis and the hydroxyl number of the compositions show that they contain pentaerythritol-derived and phosphito moieties in substantially equimolar proportions, and that they have substantially one hydroxyl group per phosphito group. Generally the compositions comprise from 40 to 65% of the monomer, the balance being mainly dimer, trimer, and tetramer, with traces of higher polymers. Individual components of the compositions thus have molecular weights ranging from 164 to about 1600, and the number-average molecular weight is considerably greater than 164, that of the preferred compositions being from 250 to 500. The phosphorus content found is 18–20% when the ratio of the initial reactants taken is 1:1, falling to as low as 15% when a small excess of pentaerythritol is used. The hydroxyl number found is in the range from 300 to 400.

The polymers have the practical advantage that they are soluble in polyalkylene ether glycols commonly employed in the production of polyurethanes (see, for example, U.S. Pats. 3,194,793 and 3,251,788).

The polymerized phosphite polyol compositions of the invention are useful in the production of polyurethanes of superior flame retardancy and generally improved physical properties. For this purpose, my polyphosphite polyol compositions are commingled with known poly-(oxyalkene)polyols commonly used for production of polyurethanes by reaction with arylene polyisocyanates, my polymers constituting generally up to about 20% of the polyol mixture, by weight. These admixtures are homogeneous liquids, and are especially advantageous in making polyurethanes by the one-shot process. The proportions in which my new polyphosphite polyols are used is a matter of choice, depending on the degree of flame resistance desired, balanced with other properties. An amount equal to 5–10% of the weight of the polyurethane formulation gives adequate flame retardancy.

In semi-rigid polyurethane foams containing my polymerized phosphite compositions, one or more of such physical properties as tensile strength, tear strength, and recovery after compression are found to be superior to those of comparable commercial foams. Foams made according to my invention meet the requirements of specifications laid down by the automobile industry.

It is usually desirable to stabilize my polyphosphite polyol compositions against increase in viscosity during storage by the addition of suitable amounts of dimethylformamide. A useful range is from 2% to about 10% (by weight), from 3% to 6% usually being adequate and highly effective.

The following examples illustrate the various aspects of my invention.

PREPARATION OF POLYMERIC PHOSPHITE POLYOLS

Example 1

Ingredients:
Triphenyl phosphite _____ 3,100 g. (10 moles).
Pentaerythritol, tech.
(86–87% monomer) _____ 1,360 g. (10 moles).
Diphenyl phosphite _____. 30 g. (0.13 mole).
Phenol _____ 282 g.

Reactants, catalyst and phenol were combined and the resulting mixture was heated with stirring to 100° C., causing solution. The solution was stirred at about 100° C. for one hour. Then vacuum was applied (15–10 mm. pressure) and phenol was removed by distillation, during which the pot temperature rose gradually and reached 130° to 140° C. toward the end of the distillation. Then the pressure was reduced to 0.5–0.3 mm. to remove residual phenol. The product was a viscous resin.
*Analysis.*—19.95% P; hydroxyl number: 321. Viscosity at 25° C.: 312.00 cp.

Example 2

To a 3-necked round bottom 500 ml. glass reactor, equipped with a distillation column and a stirrer, were added 136 g. (1.1 mole) of trimethyl phosphite, 136 g. (1.0 mole) of pentaerythritol (98% monomer) and 5 g. (0.45 mole) dimethyl phosphite. While being agitated, the reaction mixture was heated over a steam bath for about three hours, during which time most of the freed methanol was distilled off. After continuous heating for one hour at 20–30 mm. Hg and four hours at 10 mm. Hg, respectively, substantially all of the methanol had been removed resulting in a clear viscous resin containing some white precipitate. The filtered product had a Brookfield viscosity of 54,000 cps. at 25° C., 17.8% P and a hydroxyl number of 371.

Example 3

Transesterification was carried out as described in Example 1, except that 1.3 moles of pentaerythritol per mole of triphenyl phosphite were used. The resulting product was resin containing 15.1% P, and was somewhat more viscous than that of Example 1.

Example 4

Ingredients:
Tributyl phosphite _____ 217.2 g. (0.62 mole).
Pentaerythritol, tech. _____ 84.3 g. (0.62 mole).
Phenol _____ 28.0 g. (0.3 mole).
Diphenyl phosphite _____ 1.0 g. (0.043 mole).

The procedure of Example 1 was followed. The resulting product was a very viscous oil, analyzing 17.6% P.

Example 5

Ingredients:
Trimethyl phosphite _____ 124.0 g. (1.0 mole).
Pentaerythritol, tech. _____ 136.0 g. (1.0 mole).
Phenol _____ 47.0 g.
Diphenyl phosphite _____ 2.5 g. (0.011 mole).

The mixture was stirred and heated on a steam bath in a reaction vessel fitted with a condenser and a drying tube. After one hour, a solution resulted, and the temperature had dropped from 95° to about 70° C. The condenser was then replaced by a Vigreux column. A rapid distillation of methanol occurred. After about 1.5 hours, the distillation ceased and the temperature of the reaction solution rose to 100° C. The solution was then heated gradually to 140° C., causing additional distillation of methanol. When distillation ceased, the pressure was reduced, causing distillation of phenol. The residual phenol was finally removed at 0.1–0.3 mm. pressure. The pot residue was a viscous, clear resin.

*Analysis.*—15.7% P.

Example 6

Ingredients:
- Tributyl phosphite _____ 125 g. (0.5 mole).
- Pentaerythritol, tech. _____ 68 g. (0.5 mole).
- Phenol _____ 94 g.
- Diphenyl phosphite _____ 1 g. (0.0043 mole).

The process of Example 5 was followed, except that the final pot temperature was 115° C. The pot residue was a viscous, clear oil.

*Analysis.*—16.6% P.

The polymers of Examples 1 through 6 were all viscous liquids, were soluble in polyols of the kinds commonly used in making polyurethanes, and contained pentaerythrityl and phosphito radicals in ratios of at least 1.0 but less than 1.5. When, however, the procedure of Example 1 was followed, using either 0.8 or 1.5 moles of pentaerythritol per mole of triphenyl phosphite, the resulting products were solid resins which were not miscible with the common polyurethanogenic polyols in useful proportions, tending to separate out as solid lumps and hence being impossible to use for making polyurethanes of uniform structure and good strength.

PREPARATION OF POLYURETHANES

The following examples illustrate the use of my polyphosphite polyol compositions in the production of flame retardant polyurethane foams ranging from flexible to rigid types.

The flammability of the foam is rated on a numerical scale on which the higher the number, the less flammable is the foam. The test is run as follows:

A stick of polymer is clamped in a vertical position inside a glass chimney. A mixture of gaseous oxygen and nitrogen flows upward inside the glass chimney past the sample. The $O_2/N_2$ ratio and the flow rate are accurately controlled. The sample is ignited from the top. The $O_2/N_2$ ratio is adjusted until the sample just barely supports a flame. This usually requires several trials. This critical oxygen concentration is designated the Oxygen Index, being calculated as the volume-percent of oxygen in the gas mixture.

The test is accurate and reproducible. The geometry and size of the sample (within reasonable practical limits) do not affect the results, which are reproducible to within ±0.3 unit or less. The data reported here were obtained with standard blocks of polymer measuring 6 x 0.5 x 0.5 inch.

Example 7

This example illustrates the utility of my polymerized phosphite polyols in the production of flame-retarded flexible urethane foam.

The formulation is given in Table I. The foam samples were prepared using a well-known "one-shot" technique— that is, the polyalkylene polyether polyol, flame retardant, water and catalysts were thoroughly blended and then mixed with toluene diisocyanate and poured into a mold. A surfactant, e.g., up to 2 g. of a silicone-glycol copolymer, can suitably be included in the blends of this and the following polyurethane Examples. Foam is produced in this Example through the action of carbon dioxide formed by the reaction of the water with the isocyanate. In the other polyurethane Examples, the foam is due to the volatilization of the trichloro fluoromethane. Other foam producing agents may be used and are well known in this art. The resulting foam was subjected to a 20-minute cure cycle at 100° C.

The foam thus prepared ("Foam B") was rated as "self-extinguishing" according to the ASTM 1692-59T flammability test, and had an oxygen index of 22.2. The foam prepared without the organophosphorus polyol of this invention ("Foam A") was rated as "burning," and had an oxygen index of 16.4

TABLE I.—FLEXIBLE FOAM FORMULATION

| Components | Amounts | |
|---|---|---|
| | Foam A | Foam B |
| Polypropoxylated glycerol (MW 3,000), g | 100 | 84.5 |
| Polyphosphite polyols (from Example 1), g | | 15.5 |
| Stannous octoate (catalyst), cc | 0.3 | 0.5 |
| 1,4 diazodicyclooctane (33% solution in dipropylene glycol) (catalyst), cc | 0.3 | 0.7 |
| Bis(dimethylaminoethyl) ether (70% solution in dipropylene glycol) (catalyst), cc | 0.3 | 0.3 |
| Water, g | 4.0 | 4.0 |
| Toluene diisocyanates (80/20 mixture of 2,4- and 2,6-isomers), g | 48.0 | 54.0 |

Example 8

This example illustrates the utility of my polyphosphite polyols in the production of flame-retarded rigid urethane foam.

The formulation is given in Table II. The foam samples were prepared by a "one-shot" technique, as in Example 7. The resulting foam was aged for one week and then tested for flammability.

The foam containing the polyphosphite polyol of this invention was rated as "non-burning" by ASTM 1692–59T test, and had an oxygen index of 24.0. The foam prepared without the flame retardant was rated as "self-extinguishing" by the ASTM 1692–59T test, and had an oxygen index of only 20.4.

TABLE II.—RIGID URETHANE FORMULATION

| Components | Amounts, g. | |
|---|---|---|
| | Foam C | Foam D |
| N,N″,N‴-tris(2-hydroxypropyl)-N′-aminoethylpiperzaine of OH number=520 | 70 | 51.4 |
| Propoxylated sorbitol of OH number=490 | 30 | 22.0 |
| Polymerized phosphite of Example 1 | | 226.6 |
| PAPI (polymeric diphenylmethane diisocyanate) | 136 | 123.2 |
| Trichlorofluoromethane | 45 | 45 |

Example 9

This example illustrates the utility of my polymeric phosphite polyols in semi-rigid urethane foam.

The formulation is given in Table III. The foam samples were prepared by a "one-shot" technique. All but the isocyanate were thoroughly blended, then mixed with the isocyanate and quickly poured into an 8½ x 5 x 2¾ inch rectangular mold. The resulting foam was then aged for one week. The oxygen index of the foam containing the polyphosphite polyols was 23.5, whereas that of the foam prepared without the flame retardant was 19.9.

TABLE III.—SEMI-RIGID FOAM FORMULATION

| Components | Amounts | |
|---|---|---|
| | Foam E | Foam F |
| Propoxylated glycerol, MW 3,000, g | 136.0 | 123.0 |
| Propoxylated ethylene diamine of OH number=770, g | 15.2 | 13.0 |
| Polyphosphite polyols from Example 1, g | | 13.3 |
| Diazodicyclooctane (as in Example 7), cc | 0.5 | 0.5 |
| Trichlorofluoromethane, g | 13.3 | 13.3 |
| Water, cc | 1.4 | 1.4 |
| Crude diphenylmethane diisocyanate, g | 71.3 | 74.4 |

Example 10

This example illustrates the utility of my polymerized phosphite polyols in unsaturated polyesters.

An alkyd was prepared using tetrachlorophthalic anhydride, maleic anhydride and propylene glycol in a ratio such that the resultant polymer contained 20% chlorine. The alkyd was dissolved in styrene, then the flame retardant and benzoyl peroxide were added. The resulting resin was poured into a 6 x 6 x ⅛ inch mold and cured at 70° C. until gelled. The gel was then post-cured for two to three hours at 100° C. The resulting castings were then cut into strips 6 x ½ x ⅛ inch for oxygen index test. The results of the flammability test are summarized in Table IV. A commercial flame retardant is shown in a similar formulation for comparison.

TABLE IV.—UNSATURATED POLYESTER

| Flame retardant added | Concentration, percent | Oxygen index |
|---|---|---|
| None | | 24.6 |
| Polyphosphite polyols (Example 1) | 5 | 29.2 |
| Tris (2,3 dibromopropyl) phosphate | 5 | 28.4 |

Example 11

This example illustrates the utility of my polymeric phosphite polyols in flexible polyvinyl chloride resin, formulated as shown in Table V. The plastisols were poured into molds 6 x 6 x ¼ inch and cured at 320° F. for ten minutes. The resulting castings were then cut into strips 6 x ½ x ⅛ inch. The observed oxygen index values are shown.

Tricresyl phosphate was included in this test for comparison, since it is one of the recognized flame-retardant plasticizers for PVC. The results of the flammability test are given in Table V.

TABLE V.—POLYVINYL CHLORIDE FORMULATION

| Ingredients, by wt.: | Amounts | | | |
|---|---|---|---|---|
| Polyvinyl chloride (emulsion polymer inherent viscosity=0.88) | 100 | 100 | 100 | 100 |
| Epoxidized soya oil of 6.5% oxirane content | 5 | 5 | 5 | 5 |
| "Mark KCB" stabilizer (Ba, Cd, Zn salts) (Argus Chemical Corp.) | 3 | 3 | 3 | 3 |
| Dioctyl phthalate | 80 | 72.5 | 70 | 50 |
| Polymer of Example 1 | | 7.5 | 10 | |
| Tricresyl phosphate | | | | 30 |
| Oxygen index | 21.4 | 22.2 | 22.8 | 23.2 |

Since the oxygen index values are accurate to within about 0.3 unit, it is seen that 30 parts of tricresyl phosphate are about equivalent in effectiveness as a flame retardant to 10 parts of my polymeric phosphite polyol, in PVC.

My polymerized phosphite polyol composition was also compared with the known monomer from which it is made (viz., the bicyclic, or bridged-ring pentaerythritol phosphite $P(OCH_2)_3CCH_2OH)_6$ as a flame retardant in a polyurethane formulation. The semi-rigid foam F of Table III, above, was duplicated, except that the 13.3 grams of polymerized phosphite polyol was replaced by 13.3 grams of the said monomer. The properties of the two foams are shown in Table VI, against those of a control.

TABLE VI

| Flame retardant | None | Polymer | Monomer |
|---|---|---|---|
| Tensile strength (p.s.i.) | 17.3 | 25.7 | 21.0 |
| Elongation, percent | 30.0 | 36.7 | 33.0 |
| Compression set (50% deflection in ASTM D2406-65T-B), percent | 21.8 | 39.4 | 51.7 |
| Oxygen index | 19.9 | 23.5 | 22.5 |

The phosphite polymer is seen to be superior to the monomer in every test.

The same phosphite polymer and monomer were also compared, weight for weight, in flexible urethane foam according to the formulation in Example 7 above. Table VII shows the results:

TABLE VII

| Flame retardant | None | Polymer | Monomer |
|---|---|---|---|
| Tensile strength (p.s.i.) | 15.7 | 20.0 | 9.3 |
| Elongation, percent | 180 | 85 | 90 |

In flame retardancy, the polymer and the monomer were equal. But the monomer, alone, was damaging to the tensile strength, the foam with monomer being weak and easily torn, whereas the polyphosphite polyol composition improved the strength of the foam over that of the control. Evidently the monomer, having but one hydroxymethyl group, forms end groups in the polyurethane (as stated in British Pat. 889,338, page 2) and thus unduly blocks chain growth and the forming of sufficient cross-links to give the foam strength, whereas my polymerized composition, being polyhydroxylic, forms sufficient cross-links to produce a foam of excellent strength (in spite of its monomer content).

I claim:

1. A fluid polyphosphite polyol composition wherein the structure of the polymer entities is represented nominally by recurring and interlinked units having the formula

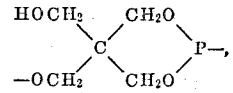

and having the following characteristics:

(1) a 35–60% content of low polymers of pentaerythritol phosphite material having at least 1.0 but less than 1.5 pentaerythritol-derived moieties per phosphito group, the balance consisting essentially of monomeric pentaerythritol phosphite of the same composition as the polymers;
(2) a hydroxyl number in the range from 300 to 400;
(3) a number-average molecular weight substantially greater than 164 and not exceeding about 1600;
(4) a Brookfield viscosity of at least 20,000 at 25° C.;
(5) solubility in dimethylformamide;
(6) a phosphorus content of 15–20%, said composition being prepared by the process which comprises heating at temperatures between 100° and 150° C. a pentaerythritol phosphite composed of at least one but less than 1.5 pentaerythritol moieties per phosphito group until it becomes substantially converted into a viscous liquid having a Brookfield viscosity of at least 20,000 centipoises at 25° C.

2. A polyphosphite polyol composition according to claim 1, wherein the viscosity is at least 50,000 centipoises at 25° C.

3. A polyphosphite polyol composition according to claim 1, wherein the viscosity is in the range from 100,000 to 300,000 centipoises at 25° C.

4. A product according to claim 1 wherein pentaerythritol and phosphite moieties are present in equimolar proportions.

5. A product according to claim 1 having essentially the structure

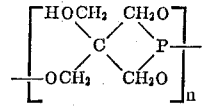

wherein $n$ has a range of values up to about ten.

6. A composition consisting essentially of (a) the composition of claim 1 and (b) an amount of dimethylformamide effective to stabilize the product against polymerization during storage.

7. A composition according to claim 6 wherein the dimethylformamide constitutes 2–10% of the composition.

8. A composition according to claim 6 wherein the dimethylformamide constitutes 3–6% of the composition.

9. The process which comprises heating at temperatures between 100° and 150° C. monomeric pentaerythritol phosphite prepared by transesterification of more than 0.67 mole but not more than 1.0 mole of a trialkyl or triaryl phosphite and one mole of pentaerythritol until it becomes converted into a viscous, polyhydroxyalkyl polyphosphite material having a Brookfield viscosity of at least 20,000 centipoises at 25° C.

10. The process which comprises heating at temperatures between 100° and 150° C. a pentaerythitol phosphite composed of at least one but less than 1.5 pentaerythritol moieties per phosphite group until it becomes substantially converted into a viscous liquid having a Brookfield viscosity of at least 20,000 centipoises at 25° C.

11. The process which comprises heating a reaction product comprising essentially the pentaerythritol phosphite having the structure

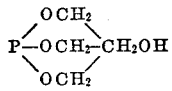

at temperatures between 100° and 150° C. until it becomes substantially converted into a viscous, polyhydroxy polymeric material having a Brookfield viscosity in the range from about 20,000 to 800,000 centipoises at 25° C.

12. The process which comprises transesterifying at least 1.0 mole but less than 1.5 moles of pentaerythritol and 1.0 mole of a trialkyl phosphite, removing the alcohole formed and heating the resulting pentaerythritol phosphite as in claim 10.

13. The process of claim 12 wherein the trialkyl phosphite and the pentaerythritol are used in equimolar proportions.

References Cited
UNITED STATES PATENTS

| | | | |
|---|---|---|---|
| 3,000,850 | 9/1961 | Ainsworth | 260—982 X |
| 3,155,703 | 11/1964 | Emmons et al. | 260—982 X |
| 3,293,327 | 12/1966 | Hechenbleikner et al. | 260—982 X |
| 3,254,142 | 5/1966 | Oertel et al. | 260—928 |

FOREIGN PATENTS

| | | | |
|---|---|---|---|
| 426,273 | 3/1967 | Japan | 260—936 |

LORRAINE A. WEINBERGER, Primary Examiner

R. L. RAYMOND, Assistant Examiner

U.S. Cl. X.R.

252—182; 260—2.5 AM, 2.5 AJ, 77.5 AR, 927 R, 968, 982, 989